(12) United States Patent
Gershon et al.

(10) Patent No.: US 8,296,417 B1
(45) Date of Patent: Oct. 23, 2012

(54) PEAK TRAFFIC MANAGEMENT

(76) Inventors: Alexander Gershon, Seattle, WA (US);
Allen Brady Montz, Seattle, WA (US);
Owen D. Hay, Seattle, WA (US); Wade Kiyoshi Wakashige, Kirkland, WA (US); Karen Hwei M. Quek, Seattle, WA (US)

( * ) Notice: Subject to any disclaimer, the term of this patent is extended or adjusted under 35 U.S.C. 154(b) by 379 days.

(21) Appl. No.: 12/181,952

(22) Filed: Jul. 29, 2008

(51) Int. Cl.
*G06F 15/173* (2006.01)
*G06F 15/16* (2006.01)

(52) U.S. Cl. ........................................ 709/224; 709/228

(58) Field of Classification Search .................. 709/224, 709/228
See application file for complete search history.

(56) References Cited

U.S. PATENT DOCUMENTS

| | | | | |
|---|---|---|---|---|
| 6,006,269 A * | 12/1999 | Phaal | ............................. | 709/227 |
| 6,978,298 B1 * | 12/2005 | Kuehr-McLaren | ........... | 709/223 |
| 7,012,893 B2 * | 3/2006 | Bahadiroglu | ................ | 370/231 |
| 7,231,447 B2 * | 6/2007 | Kuroda | .......................... | 709/226 |
| 7,239,609 B2 * | 7/2007 | Yokota et al. | ................. | 370/230 |
| 7,287,082 B1 * | 10/2007 | O'Toole, Jr. | .................. | 709/228 |
| 7,373,416 B2 | 5/2008 | Kagan et al. | | |
| 7,395,335 B2 * | 7/2008 | Brown et al. | ................ | 709/226 |
| 7,490,162 B1 * | 2/2009 | Masters | ......................... | 709/238 |
| 7,584,248 B2 * | 9/2009 | Guo et al. | ..................... | 709/205 |
| 7,600,014 B2 * | 10/2009 | Russell et al. | ................ | 709/224 |
| 2002/0002488 A1 * | 1/2002 | Muyres et al. | .................. | 705/14 |
| 2002/0004855 A1 * | 1/2002 | Cox et al. | ...................... | 709/328 |
| 2002/0022516 A1 * | 2/2002 | Forden | ............................ | 463/32 |
| 2002/0091836 A1 * | 7/2002 | Moetteli | ........................ | 709/227 |
| 2003/0105666 A1 * | 6/2003 | Taub et al. | ........................ | 705/14 |
| 2004/0039784 A1 * | 2/2004 | Jacobs et al. | ................... | 709/206 |
| 2004/0153557 A1 * | 8/2004 | Shochet et al. | ............... | 709/229 |
| 2004/0185872 A1 | 9/2004 | Emmerson et al. | | |
| 2004/0254836 A1 | 12/2004 | Emoke Barabas et al. | | |
| 2005/0020346 A1 | 1/2005 | Baerlocher | | |
| 2005/0143162 A1 | 6/2005 | Schneier et al. | | |
| 2005/0144254 A1 | 6/2005 | Kameda | | |
| 2005/0188051 A1 | 8/2005 | Sneh | | |
| 2006/0247060 A1 | 11/2006 | Hanson et al. | | |
| 2007/0054717 A1 | 3/2007 | Youm et al. | | |
| 2007/0060303 A1 | 3/2007 | Govender et al. | | |
| 2007/0077981 A1 * | 4/2007 | Hungate et al. | .................. | 463/16 |
| 2007/0226364 A1 * | 9/2007 | Landspurg | ..................... | 709/231 |
| 2007/0255811 A1 * | 11/2007 | Pettit et al. | ..................... | 709/220 |
| 2008/0004946 A1 | 1/2008 | Schwarz | | |
| 2008/0102947 A1 * | 5/2008 | Hays et al. | ....................... | 463/31 |
| 2008/0263673 A1 * | 10/2008 | Brun et al. | ..................... | 709/203 |
| 2009/0010179 A1 * | 1/2009 | Laroia et al. | ................... | 370/254 |

* cited by examiner

*Primary Examiner* — Minh-Chau Nguyen
(74) *Attorney, Agent, or Firm* — Kilpatrick Townsend and Stockton LLP

(57) ABSTRACT

Users are allowed to communicate with a server via a local client even when the server experiences an abnormal peak of traffic. The local client is configured to send a new connection request only after a specified time interval passes from a previous connection. The local client presents content, such as a game, that makes it appear to the user as if the user is interacting with the server while the local client is waiting for reconnection to the server. The user interactions during the time interval are locally stored and later provided to the server for further process.

16 Claims, 17 Drawing Sheets

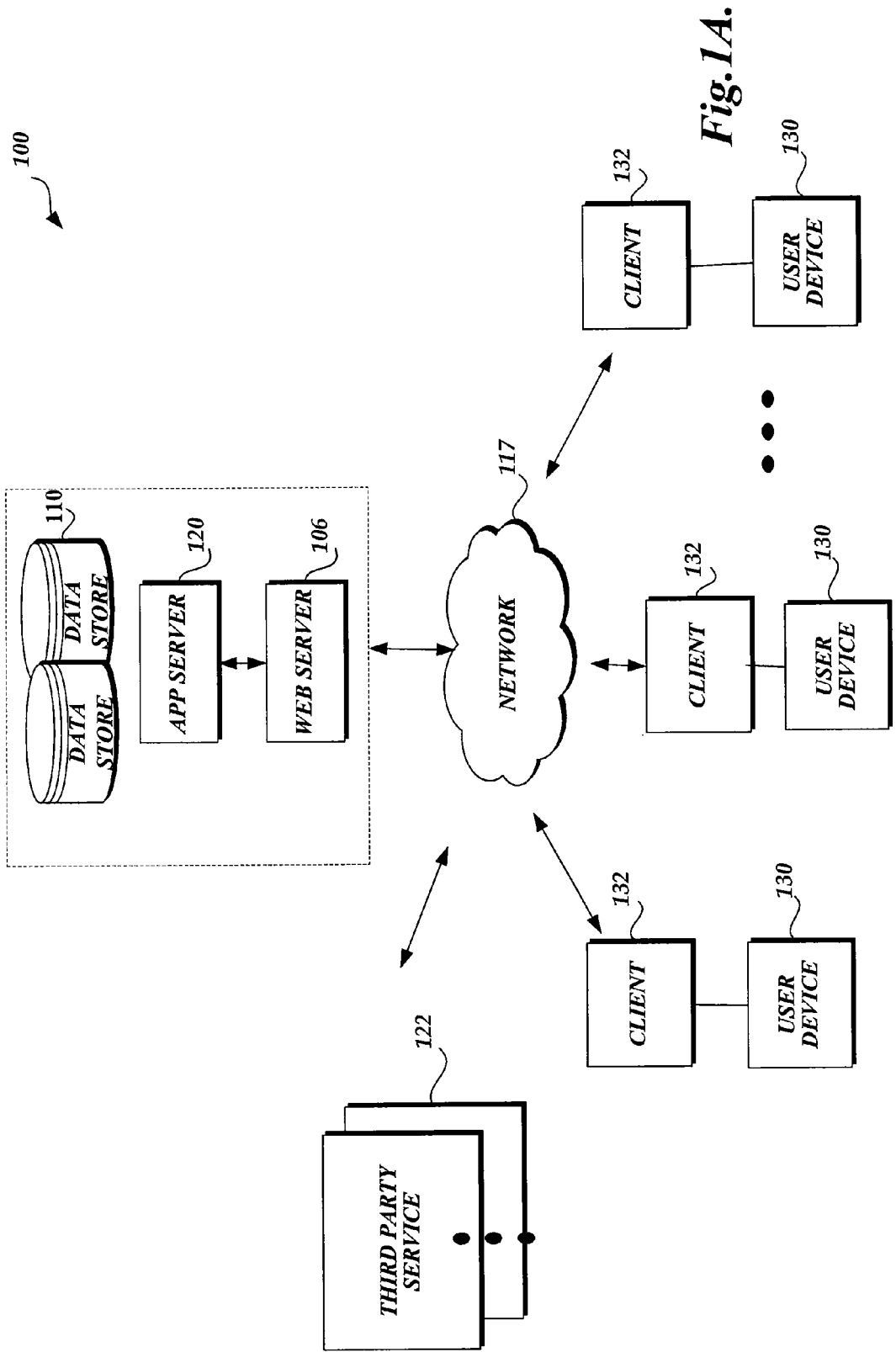

PEAK TRAFFIC MANAGEMENT

BACKGROUND

As the popularity of the Internet increases, the number of users who want to purchase items or receive information about items over the Internet, as well as the number of service providers that offer such services, such as electronic marketplaces, exponentially grow. Advantages of purchasing from/ through an electronic marketplace are numerous. For example, an electronic marketplace can include offers for items from several different merchants, parties, or sources, for example, whereby users (e.g., customers) can compare several offers for an item, where each offer corresponds to a different source, and may include different terms, such as merchant-specific pricing, shipping charges, promotions, conditions, and quality, etc. Electronic marketplaces also facilitate advertising campaigns or offer promotions to attract more users to their Web site. One of the most important aspects of promotions and advertisement campaigning may be providing a good customer experience which will lead new customers to have an interest in, or to purchase or otherwise consume, items through the electronic marketplace.

However, some promotions can attract an unexpectedly high number of users to visit an electronic marketplace, which causes an unusual peak of traffic to a Web server of the electronic marketplace. For example, the electronic marketplace may offer special holiday promotions (e.g., an after-Thanksgiving sale, Christmas promotions, etc.) in which any user can participate through a promotion Web page. If the special holiday promotions are offered for a small window of time and/or for a limited number of items, a massive number of users, for example several millions of users, may want to access and participate in such holiday promotions during that time. Each user may request to connect to the Web server numerous times during a short period of time. For example, it is very common that many users continuously hit or refresh the promotion Web page until the promotion becomes available, or they gain a better position to obtain the promotion. However, as each hit generally requires a connection with the Web server, the connections that can accommodate such requests from the massive number of users can be far above the normal number of connections that the Web server is able to handle. If the connection requests are gravely more than those of the Web server can handle at a given time, the Web server may brownout, have to refuse taking any connection requests, or issue error messages for connection requests. This results in a bad customer experience for many users. Further, some users may then perceive that the electronic marketplace is not reliable for commerce transactions even during non-peak times. One solution may be to predict abnormal peaks of traffic and use enough numbers of servers that can manage such abnormal peaks of traffic. However, this approach can be costly and can be a waste of resources, considering that the unusual peak of traffic may only occur a few times a year.

BRIEF DESCRIPTION OF THE DRAWINGS

FIGS. 1A and 1B are pictorial diagrams showing an exemplary computing environment in which embodiments may be implemented;

DETAILED DESCRIPTION

Figure 1B:
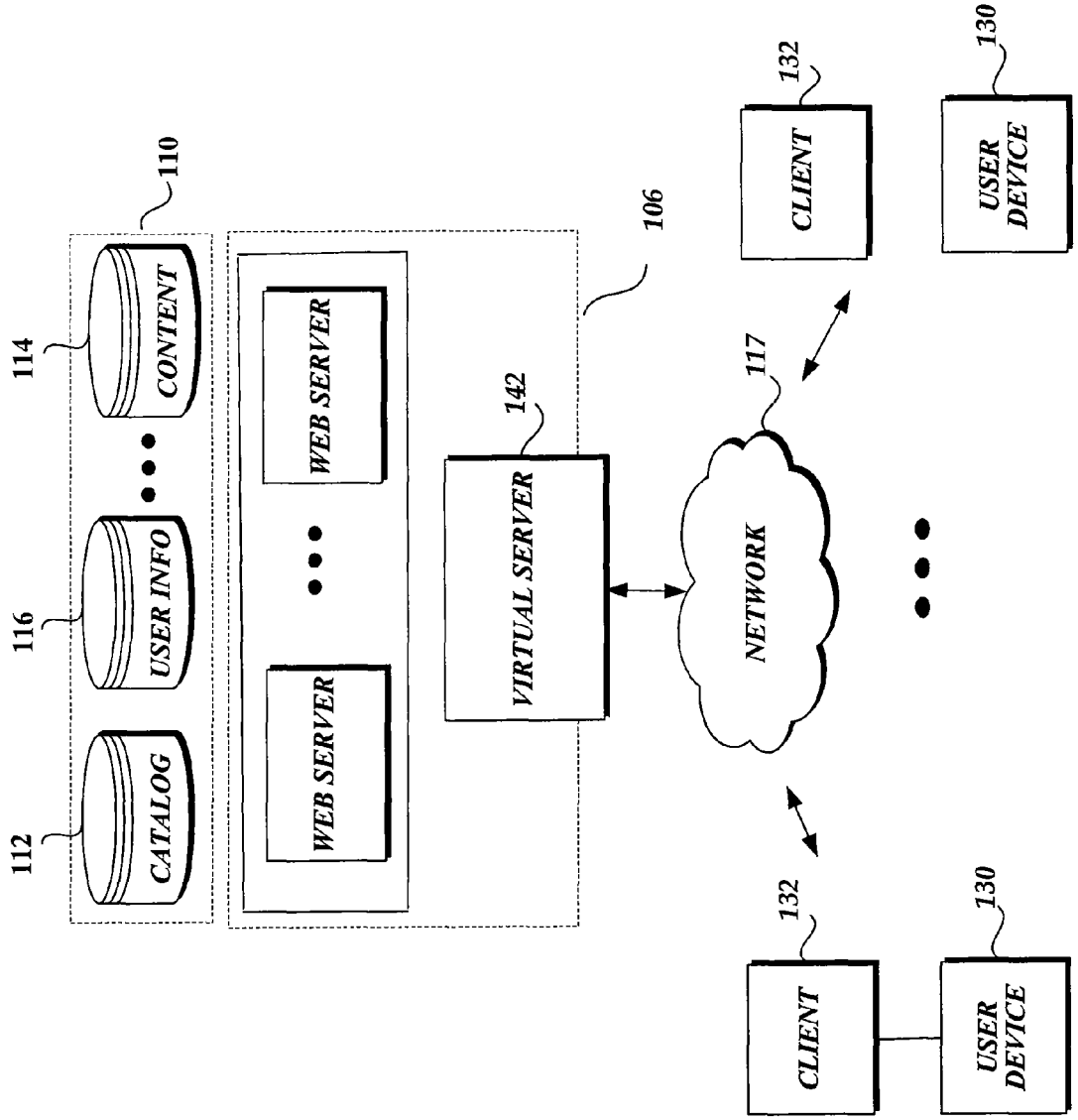

Systems and methods in accordance with various embodiments of the present disclosure may overcome one or more the aforementioned and other deficiencies experienced in conventional approaches to managing, reducing, or diverting abnormal peaks of traffic in an electronic and/or networked environment.

FIG. 1A illustrates an example of an environment 100 for implementing aspects in accordance with various embodiments. As will be appreciated, different environments may be used, as appropriate, to implement various embodiments. The environment 100 shown includes an electronic user device 130, which can include any appropriate device operable to send and receive requests, messages, or information over an appropriate network 117 and convey information back to a user of the device. A request can include any appropriate request sent over an appropriate system or network, such as a request submitted to a Web page over the Internet or a message sent via a messaging system to a content provider, for example. Examples of such user devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Protocols and components for communicating via such a network are well known and will not be discussed herein in detail. Communication over the network can be enabled by wired or wireless connections, and combinations thereof. In this example, the network includes the Internet, as the environment includes a Web server(s) 106 for receiving requests from the user device 130 and serving content in response thereto, although for other networks an alternative device serving a similar purpose could be used as would be apparent to one of ordinary skill in the art.

The environment in one embodiment is a distributed computing environment utilizing several computer systems and components that are interconnected via communication links, using one or more computer networks or direct connections. However, it will be appreciated by those of ordinary skill in the art such as the system could operate equally well in a system having fewer or a greater number of components than are illustrated in FIG. 1A. Thus, the depiction of the system 100 in FIG. 1A should be taken as being illustrative in nature, and not limiting to the scope of the disclosure.

The illustrative environment further includes one or more application server(s) 120 and a data store 110. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the user device, handling a majority of the data access and business logic for an application. The illustrative environment also include a virtual server that provides access control services to the application server(s) 120 in cooperation with the data store, and is able to generate content such as text, graphics, audio, and/or video to be transferred to the user, which may be served to the user by the Web server in the form of html for at least one Web page using hypertext transfer protocols.

In some embodiments, the Web server includes several servers 142 and a virtual server 142 that may manage a load balance among the servers in the Web server as shown in FIG. 1B. The handling of all requests and responses, as well as the delivery of content between the client and the application server 120, can be handled through the virtual server 124 of the Web server 106. Generally a Web server has defined load limits, because a Web server can handle only a limited number of concurrent client connections. As will be described in later portions of this disclosure, the virtual server may be configured to monitor traffic coming into the Web server and manage traffic congestions or peak traffic through various ways.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The data store 110 can include several separate data tables, databases, or other data storage mechanisms and media for storing data relating to a particular aspect. For example, the data store illustrated includes mechanisms for storing catalog detail data 112, user information 116, and content 114 that can be provided to a client. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server(s) 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page presented by a client 132 that the user is able to view via a browser on the user device 130. The client 132 is a client application executed on the user device 130 that presents interactive content in response to user's requests without requiring a connection with the Web server. The client 132 may cache contents, catalog, or other information, from local memory of the user device.

Under a conventional Web server system, most conventional client applications are "thin" and thus all or most processing is done on the server, and the conventional client is only used to display static (in this case HTML) content. One of the drawbacks with such system is that all interactions with the conventional client pass through the server, which requires data to be sent to the server and thus increases the traffic and number of concurrent connections needed to the server. To reduce the frequency of connections to the server, as well as the overall number of connections, the server can provide the conventional client with some type or amount of content so that the Web page is reloaded on the client in response to user's interaction. In contrast, the client 132 is a "rich" client application usually downloaded at the beginning of the application. The client 132 may be supplemented by further code downloads as the application progresses. The client 132 is configured to act as an extension of the browser, and take over the responsibility for rendering portions of the application's user interface and for communication with the server 106. The client 132 is suitable for providing asynchronous communication between the user and the server 106.

In some embodiments, at the time of downloading the client application, default information may be provided, for example, a default time interval and default content. The default content could be audio, video, games and/or text content, among other possibilities. In one embodiment, the client 132 may be configured to check a current time interval (initially a default) and wait for the current time interval before transmitting to the Web server 106 a next connection request. The time interval may change over time based on the responses received from the server. If the next connection request is somehow rejected from the Web server 106, the client 132 may obtain a next level of time interval. For example, the client 132 may double the default time interval for the next level time interval. Alternatively, the client 132 may have previously downloaded several levels of default time intervals from the server 106. If needed, the client 132 entertains the user using the default content until the next connection is made to the Web server 106. In the event of peak traffic, the Web server 106 may set a first time interval. The first time interval may be provided to the client when the client is connected to the Web server 106. The client 132 updates the current time interval with the first time interval. The Web server 106 may also provide more content to the client 132 such that no new content is needed from the server until the next time interval has expired for the next connection between the client and server. The user can interact with the client that presents the content. The user may perceive that the user is interacting in real-time with the Web server 106 when, in reality, the user is interacting with the content previously downloaded from the server. In some embodiments, the user interactions during the time interval may be queued and stored in local memory of the user device. The stored user interactions may be provided to the Web server 106 for further processing after a connection between the Web server 106 and the client 132 is re-established.

It is contemplated that any type of client can be used in the described embodiments as long as the client is able to take over the responsibility from the Web server for communicating and for rendering user interface and interactive content that is retrieved from a cache or local memory of the client. Examples of such clients may be various client applications in a web browser including, but not limited to, Adobe® Flash® applications, Microsoft® Silverlight™ applications, Ajax (javascript client) and some client applications that are not part of a web browser, including, but not limited to, Silverlight applications, Adobe® AIR™ applications, and the like. In addition, a client application written in proprietary language, and embedded on a 3rd party Website, such as, a dashboard widget application (e.g. Facebook Widget application) can be used in some embodiments. It should be further understood that although embodiments describe the server as a Web server, the server could be any kind of server that provides content to various clients. For example, the environment could be a cable head-end system/set-top box, a digital-video recorder and associated server, or an application running on a wireless phone that communicates with a central server. Thus, the depiction of the client 132 herein should be taken as being illustrative in nature, and not as limiting to the scope of the disclosure.

Figure 2A:
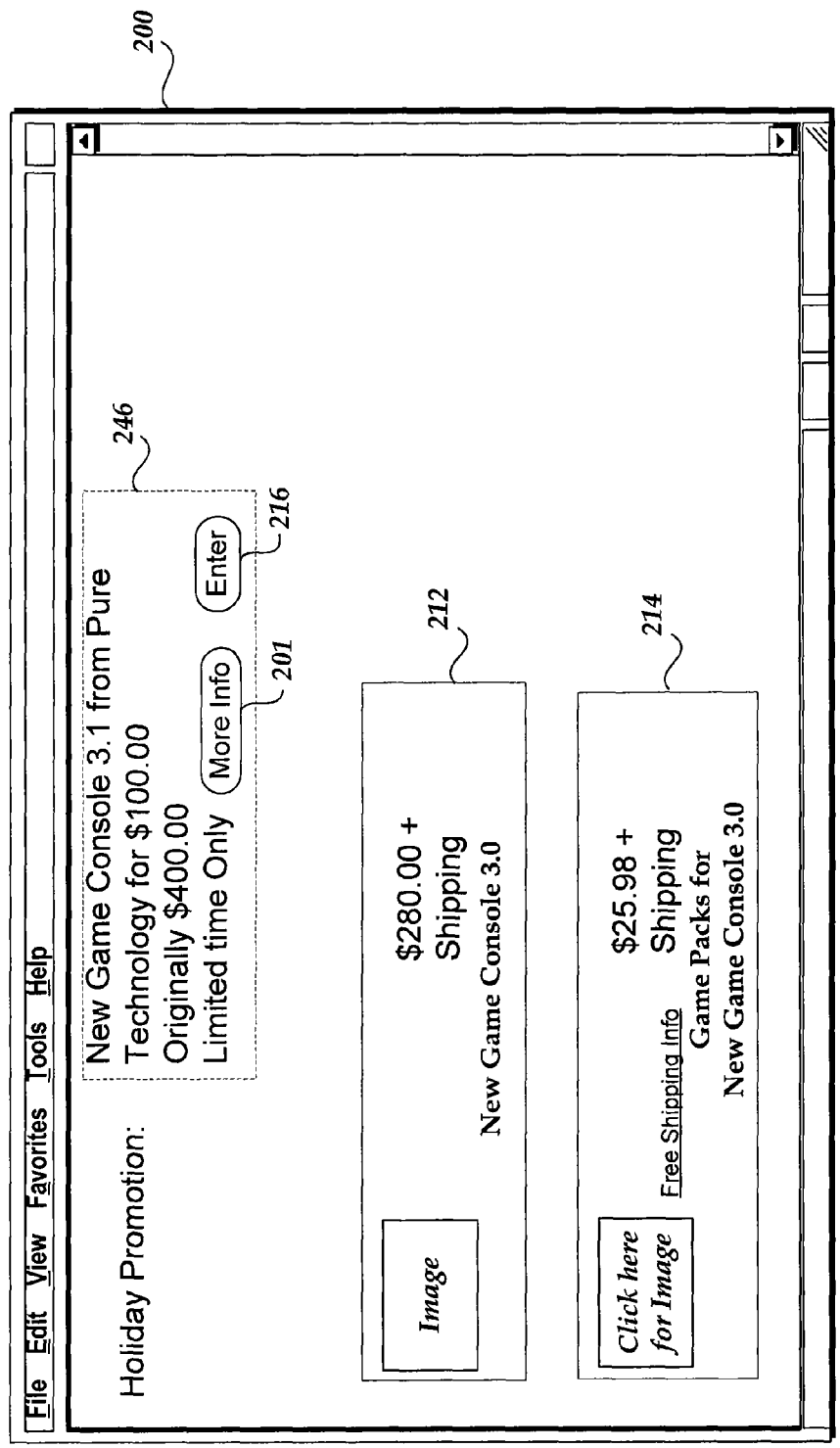
FIGS. 2A-2D are example user interfaces generated while a user interacts with the Web server via a client to participate in a promotion contest or a game in accordance with one embodiment.

For example, FIG. 2A illustrates a graphical user interface window 200 for a browser application on a user device, here displaying a Web page in which a user is able to view information relating to the content of interest, in this case a particular promotion. As shown, when a user comes to the Web site for normal services (purchasing items 212, 214 or obtaining information about items 212, 214), information about a promotion campaign 246 may be presented on the Web page. In some cases, such information is presented as a banner, or a status indicator included in a navigation menu bar of the Web page. When a user clicks on the promotion campaign, for example an "Enter" button 216, a promotion Web page may be presented to a user, explaining the promotion, how to participate, etc. During the promotion period, the Web server (hereinafter, server) allows users to participate in the promotion while the traffic is manageable. However, when peak traffic is detected at a specific point of the time, or when traffic meets or exceeds a specified threshold, the user can interact with the server asynchronously via a client application, such as the client 132. The client 132 may be configured to provide the appearance that the server is responding in real time to the user, although there is no connection to the server for a certain time interval.

Figure 2B:
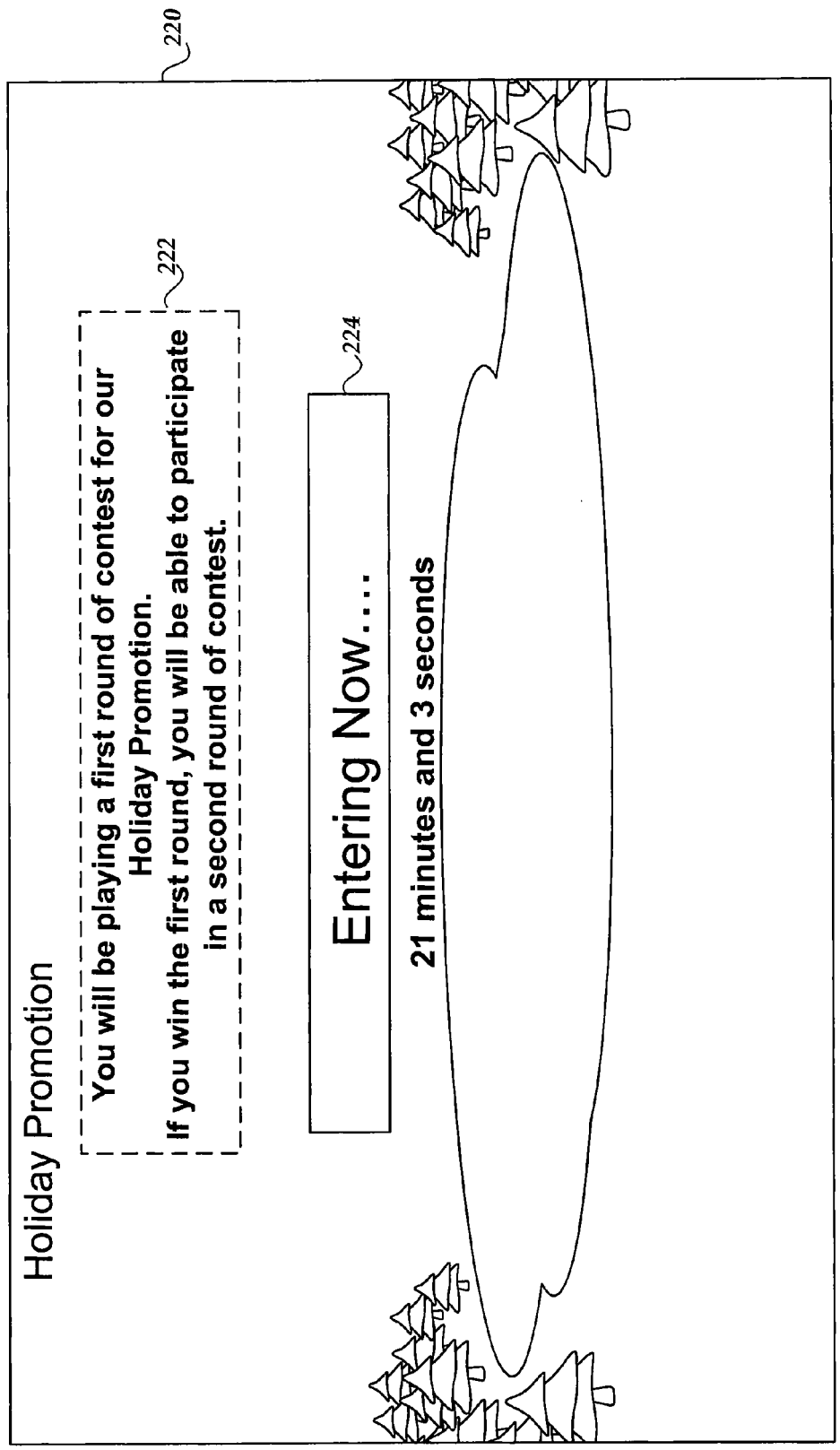

In some embodiments, the server may use a contest or game to throttle a number of current users. For example, the server may provide the client with content that includes several rounds of a contest (game) which is designed to gradually whittle down the number of current users. That is, after an initial connection with the server, a user is allowed to participate in the contest while the number of users participating in the contest has not reached a threshold number or maximum number. Referring now to FIG. 2B, example display window 220 presenting information 222 about a contest for a promotion is depicted. As shown, the user may be informed that the promotion is a "Holiday Promotion", and users need to pass a first and second round of the contest to gain a right to participate in the promotion. In one embodiment, a window of the time allowing users to start the first rounds of the contest is set up, for example, for 25 minutes. In some embodiments, the time remaining for the contest to start may be presented to the user as a form of a clock or text. As shown, "21 minutes and 3 second left" is presented to the user in FIG. 2B. Under some conditions, (such as after the window of time passes or the number of users reaches a threshold, etc.), the server may not allow any more users to enter the contest. Subsequently, the server determines the number of users (participants) to be throttled.

Figure 2C:
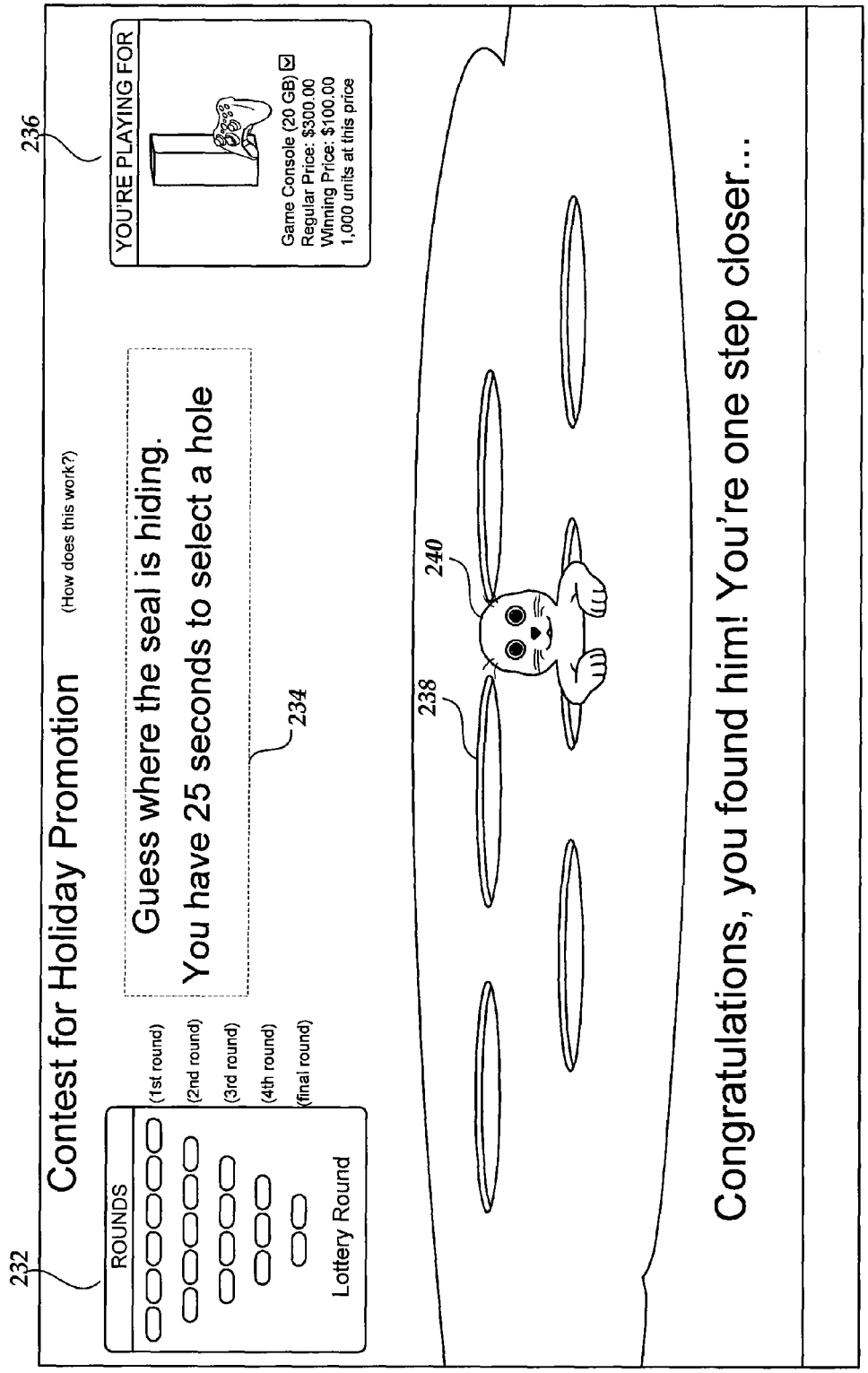

In one embodiment, the number of users to be throttled may be determined by an algorithm or heuristics that estimates a threshold number of users for the promotion contest at a given time and may be reflected in formulating contest rounds. In some embodiments, the number of contest rounds is dynamically adjusted (by adding more rounds, etc.) as the number of participants grows. Upon entering the contest or game, the user starts interacting with the client to play each round of the contest. Referring now to FIG. 2C, as shown, this example Holiday Promotion relates to a "Game Console" 236 that is offered for a discounted price. Each round is shown in "Rounds" box 232. Instructions, such as information 234 indicating how to complete a contest round, may also be presented to the user. In this example, when a user selects a hole 238 where a seal 240 is hiding, the user can pass to a next round. If the user fails any round of the contest, such as by being unable to find a hole where a seal is hiding, for example, the user can then be removed from the contest. The removed user is still able to conduct a search or purchase items available in the electronic marketplace. If the user successfully finishes at least a threshold number of initial rounds of the contest, the client can make a connection request to the server, whereby the user can continue to participate in any remaining rounds of the contest. In one embodiment, users who finish the rest of the rounds of the contest may be entitled to participate in a promotion. As it will be appreciated, there are various ways of presenting such a contest that can throttle a certain number of users and various types/rounds of a contest that can be used in connection with traffic management.

Figure 2D:
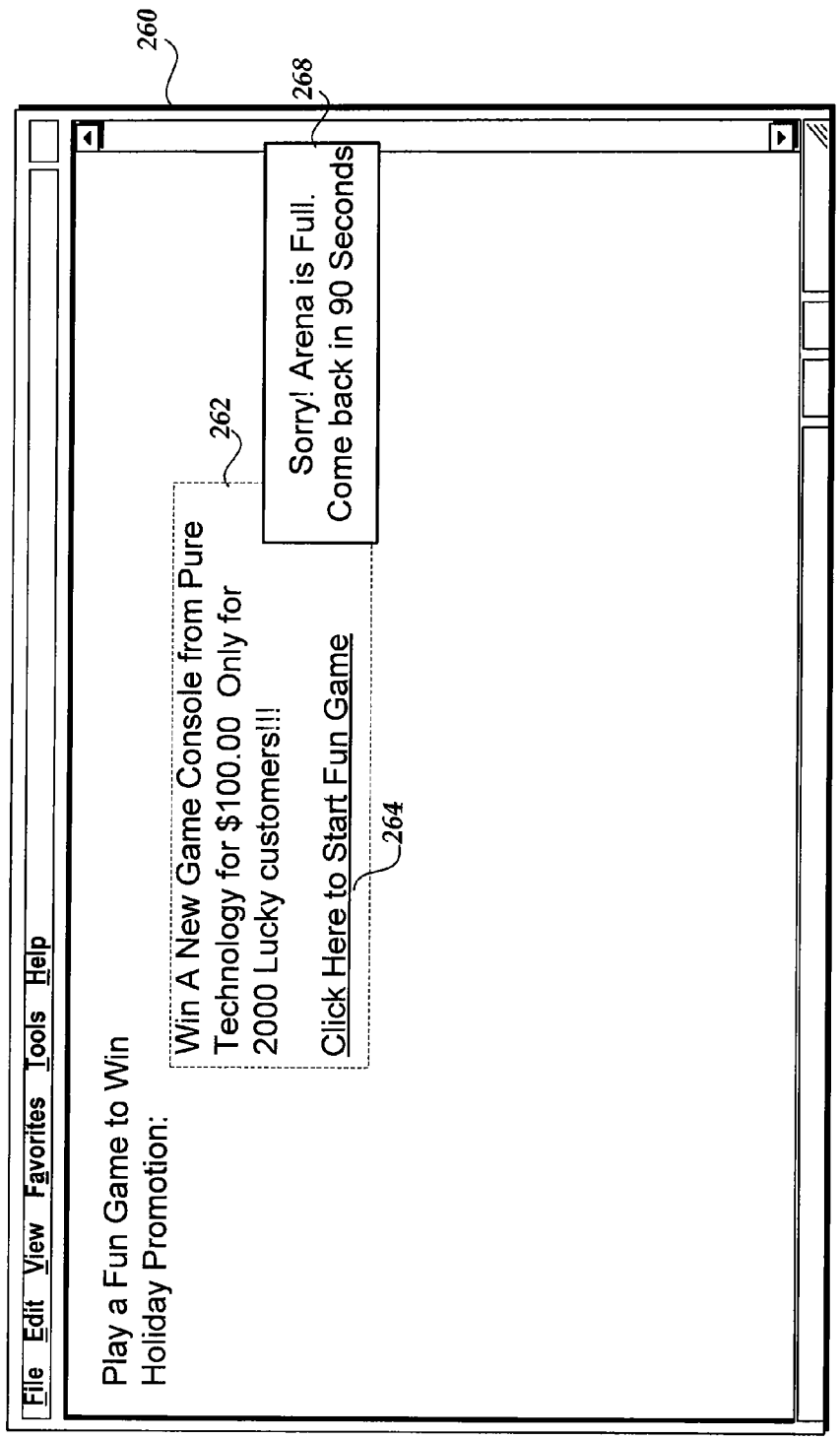
Figure 10A:
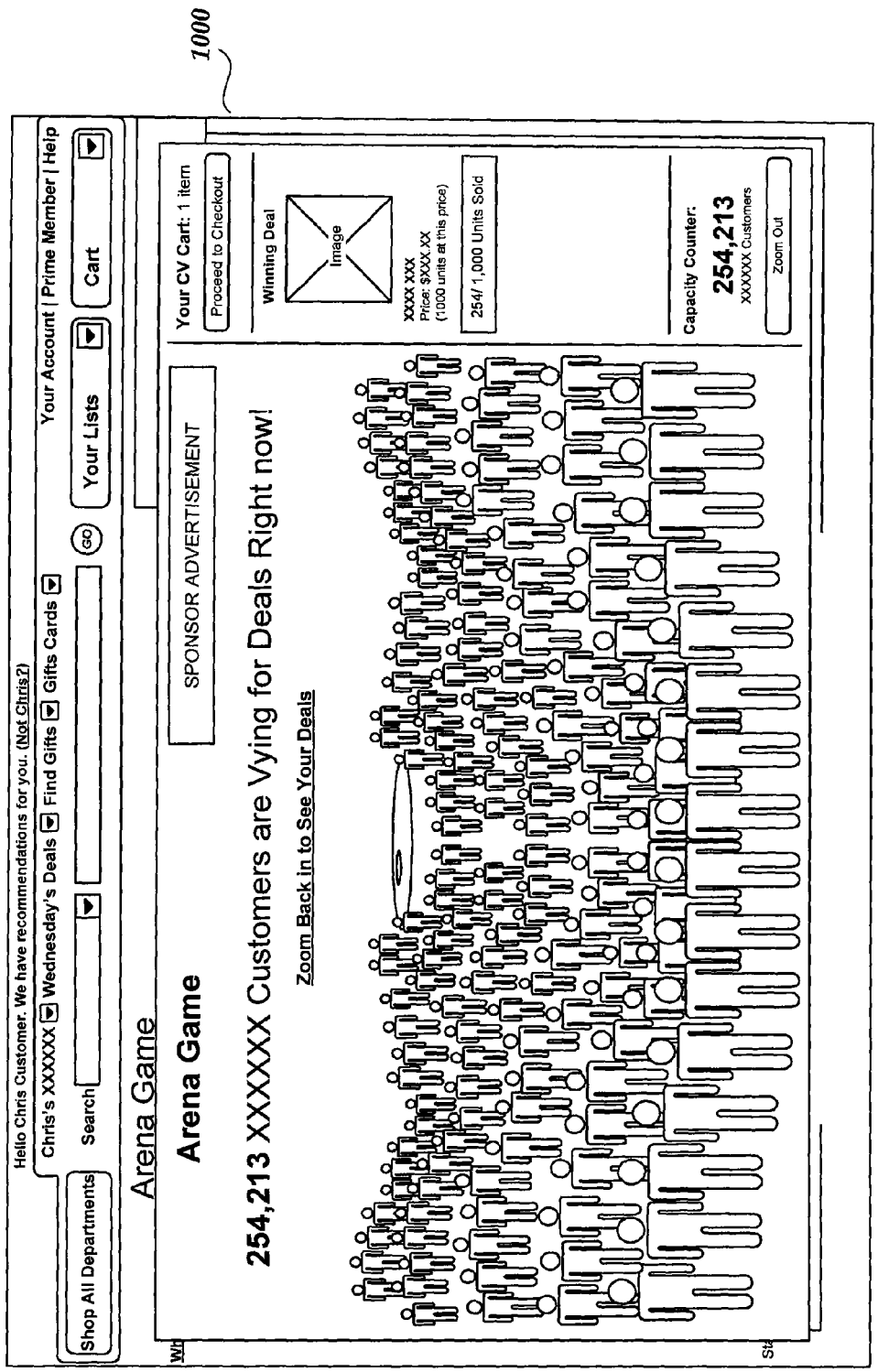
FIGS. 10A-10C are examples of screen displays generated while a client presents a several rounds of contest designed to throttle the number of participants, in accordance with one embodiment.

For example, referring to FIG. 2D, another graphical user interface window 260 is depicted that displays a Web page in which a user is able to view information relating to a particular game provided for a promotion campaign. As shown, information about a promotion campaign 262, a link 264 to enter a promotion game or contest, etc., is presented on the Web page. When a user clicks on the link 264 for participating in a game to win the promotion, a pop-up window or a subsequent window including the game may be presented to the user. In one embodiment, before the user starts the game (contest), the user may be provided with information about how many people are participating in the contest, what promotion is going on, etc. As with FIG. 2A, the user is allowed to conduct a search or purchase items available in the electronic marketplace while participating in the game, as long as a connection to the server is permitted. In one embodiment, the user is enabled to communicate with a third party service provider while participating in the game. Once the server has received a certain number of participants (e.g., in the event where the number of participant reaches the threshold number that the server can handle, etc.), the link to the game may be disabled until the number of participants is whittled down to a manageable number of participants through interacting with a client. In one embodiment, a notification, such as "Sorry, Arena is full, Come back in 90 seconds" 268 may be presented to users. Some example graphical user interface displays related to managing the number of participants in a game space will be discussed in further detail in conjunction with FIGS. 10A-10C below.

It is noted that a promotion campaign is described herein for ease of discussion. Thus, the depiction of the contest or game for a promotion should be taken as being illustrative in nature, and not as limiting to the scope of the disclosure. Mechanisms for providing a contest or game, managing promotion/item information, running an electronic store or outlet, providing for user purchasing, and other related functionality are well known in the art and will not be discussed herein in detail.

Figure 3:
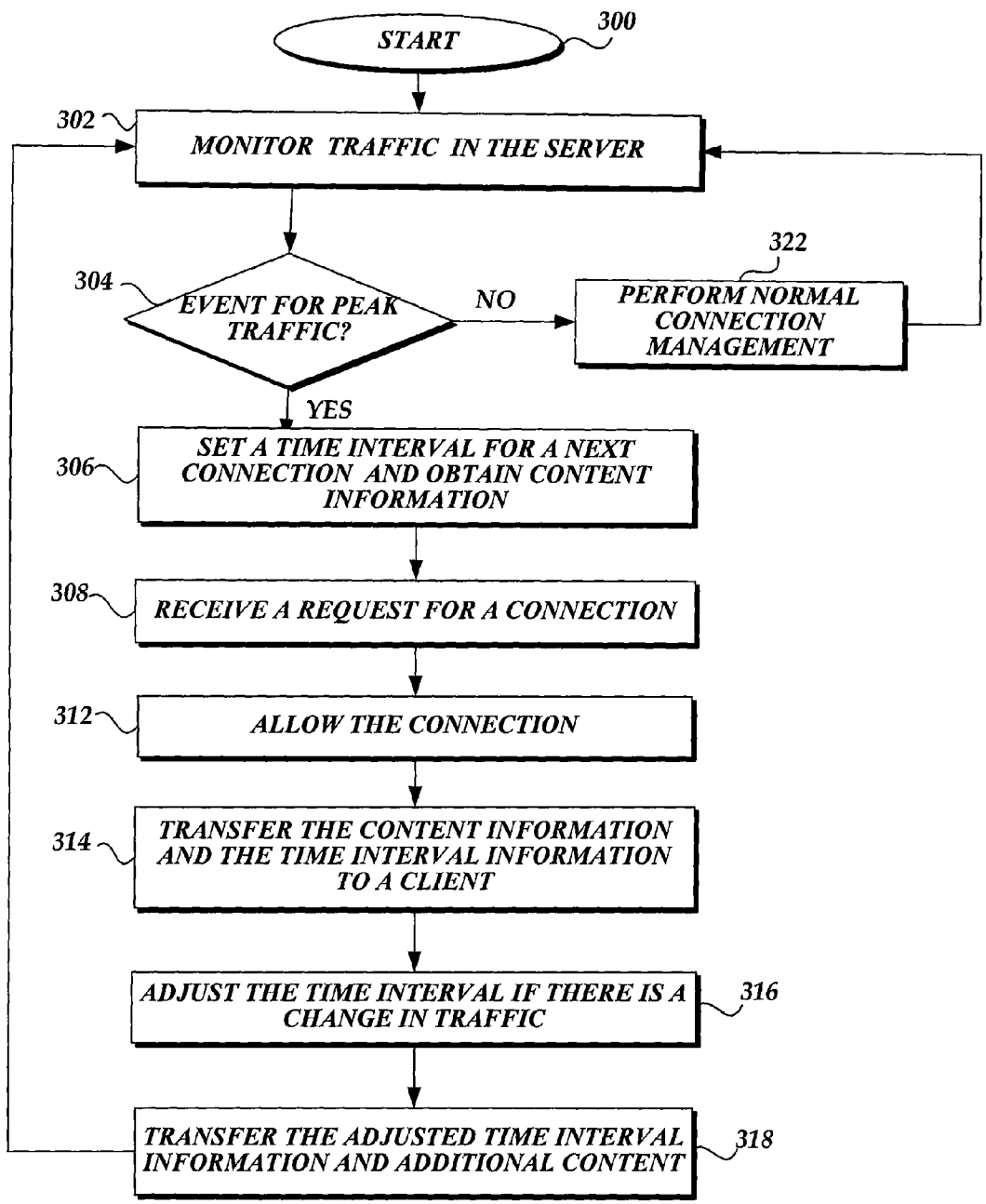
FIG. 3 is a flow diagram of a routine for a server to manage peak traffic via a client in accordance with one embodiment.

Referring to FIG. 3, a flow diagram 300 depicts an example of a traffic management routine for a server to manage peak traffic via a client application such as that described with respect to FIGS. 2A-2D, in accordance with one embodiment. Beginning with block 302, the server may monitor to detect an event that indicates peak traffic in the server. For example, the server may monitor a total number of first connections and existing connections if traffic reaches a certain threshold level. Such threshold level may be previously determined based on various factors, such as, a capacity of the server (e.g. how many connections that the server can handle), statistic information, bandwidth for concurrent connections, etc. In some embodiments, the threshold may be determined in such a way that even after the traffic reaches to the threshold, the server may be able to allow some connections while the traffic scales back to a safe level through requiring the time interval between connections from each client. At decision block 304, a determination is made as to whether an event indicating peak traffic is detected. Such an event may be detected when the number of first connections reaches a threshold level, the number of current users reaches a threshold level, a certain number of servers are down, a popular promotion campaign that attracts a massive number of users, etc. If it is determined at block 304 that such an event is not detected, (e.g., traffic reaches its threshold, one of Web severs is down, etc.), the server may perform a normal connection management at block 322. If it is determined at block 304 that such an event is detected, (e.g., traffic reaches its threshold, one of Web severs is down, etc.), the server may set a first time interval for a next connection request at block 306. In some embodiments, the server may transmit the first time interval information to clients which are currently connected to the server. Upon receipt of the first time interval information from the server, clients may be alerted about the peak traffic condition. At block 308, the server may receive a request for a connection from a client. If the connection is requested for the first time, the server generally allows the connection between the server and the client at block 312. As will be discussed in detail below, upon receipt of the first time interval information, the client may update its current time interval to the first time interval and hold from sending the server a next connection request until the first time interval passes. In one embodiment, the server may obtain content which can be used in a client to entertain or interact with the user between connections at block 314. Such content may include any type or form of content that can be presented to the user without requiring a connection to the server. The content may be video and audio content, catalog information, advertisement content, new product information, etc.

In some embodiments, the server may anticipate a future need for certain content or data, at least during the first time interval, and download the content to the client. In one embodiment, the content may be selected based on the user's profile or previous interactions with the server. Subsequently, the server also transmits the first time interval information to the client at block 316. As will be described in greater detail below, the client stores the content in local memory and uses the content, as needed, to interact with the user offline. In this manner, the client can give the appearance that the server is interacting with the user in real time. The server keeps monitoring the traffic and adjusting the time interval between connections based on changes in the amount of the traffic, the number of connections, or the capacity of the server at block 318. In one embodiment, the server may obtain additional content for the client if necessary. For example, a user has requested some information about an item that is stored in the data store during the first time interval; the client stored the request in local memory and sends the user's request to the server at the time of reconnection. Then, the server retrieves the information about the item and provides the client with the information. For another example, the client may need more content that can be presented during the adjusted time interval. At block 320, the additional content and the adjusted time interval information are transmitted to the client. The routine may repeat the above-mentioned steps. The client subsequently updates the current time interval in accordance with the adjusted time interval information.

Figure 4:
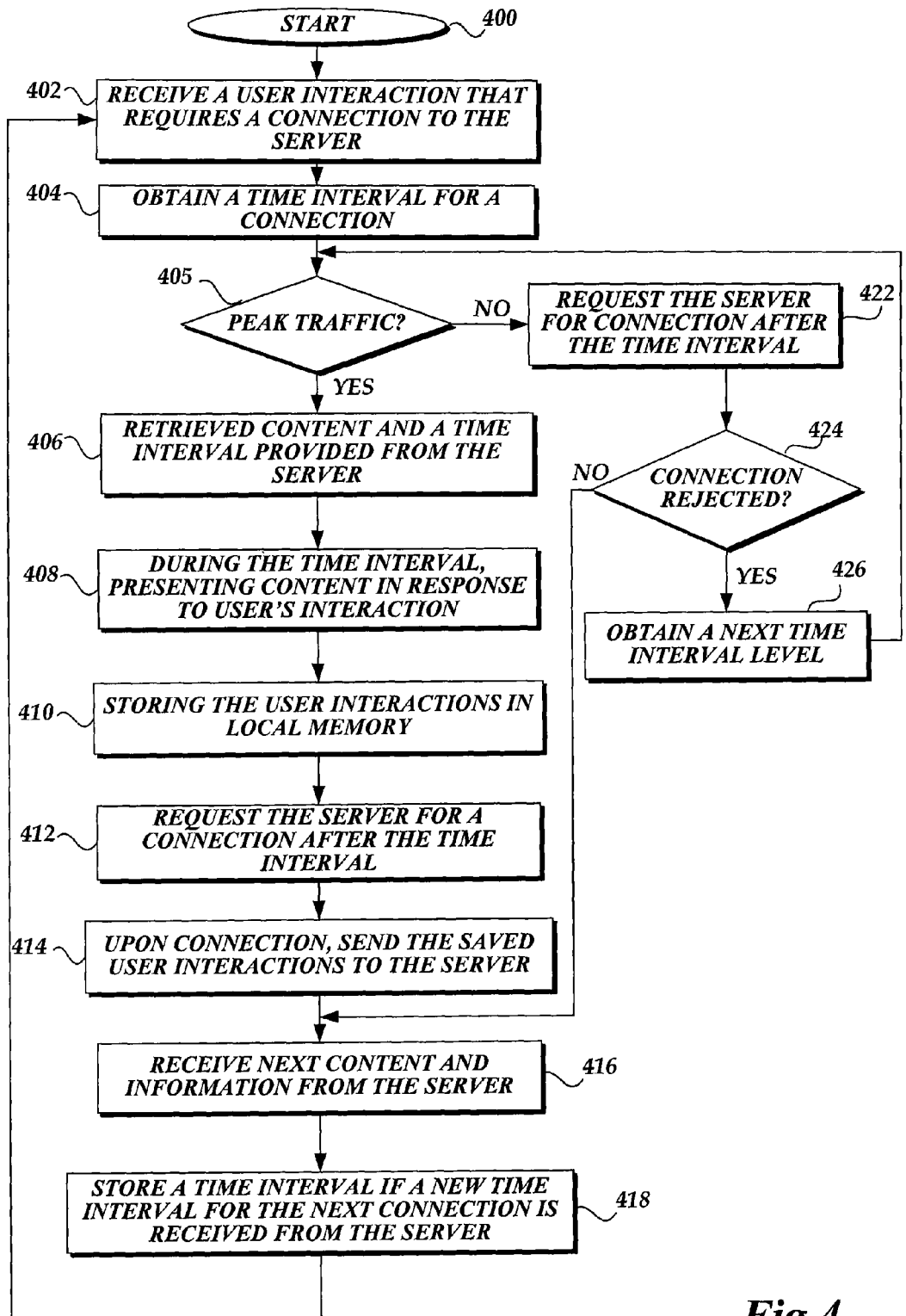
FIG. 4 is a flow diagram of a routine for a client to providing content for a time interval in response to a connection request after an initial connection with the server in accordance with one embodiment.

Referring to FIG. 4, a flow diagram 400 depicts a traffic management routine for a client to manage peak traffic via presenting interactive content in response to a user's interactions in accordance with one embodiment. Such an approach can be used in place of, or in conjunction with, the process of FIG. 3. For the sake of the discussion, it is assumed that a client has established an initial connection with the server. As discussed above, the client is a client application suitable for presenting various content items, for example, video and audio content, without connecting to the server. As discussed above, in some embodiments, at the time of downloading the client application, default information may be provided, for example, a default time interval and default content. In one embodiment, the client may be configured to check a current time interval (initially a default) and wait for the current time interval before transmitting to the server a next connection request. The time interval may change over time based on the responses received from the server. If the next connection request is somehow rejected from the server, the client may obtain a next level of time interval. For example, the client may double the default time interval for the next level time interval. Alternatively, the client has downloaded several levels of default time intervals from the server. If needed, the client entertains the user using the default content until the next connection is made to the server. In the event of peak traffic, the Web server may set a first time interval. The first time interval may be provided to the client when the client is connected to the server. The client updates the current time interval with the first time interval.

Beginning with block 402, the client receives a user interaction that requires a connection to the server. For example, the user hits a Web page (e.g., a promotion Web page, etc.), which requires a reload of the Web page. At block 404, the client may obtain a current time interval. At decision block 405, a determination is made as to whether a triggering event for the peak traffic condition is detected in the server. For example, the client determines if a time interval for a next connection request has been set up by the server. If no triggering event is detected, the client sends a connection request to the server after the current time interval passes from the previous connection at block 422.

As discussed above, the client may have a default time interval that can be used as the current time interval until a new time interval is received from the server. In one embodiment, each client also has downloaded default content that can be used before the client is reconnected to the server. In some embodiments, the client can also adjust a time interval without consulting the server. One example may have different levels of default time intervals. If a connection request is rejected, the client uses a next level of default time interval. For example, a client initially has 30 seconds for a default time interval. After a rejection the client may double the initial time interval, which is one minute. After the time interval (one minute), the client requests the server for a reconnection. If the request for connection is still rejected, the client may double the current default time interval to get the next level of time interval. Referring back to an example above, the next level of time interval becomes two minutes. In order to provide a good customer experience, the client may use the default content to entertain the user while attempting to establish a connection with the server.

At decision block 424, a determination is made as to whether the connection request has been rejected. If the connection request has been rejected, the client updates the current time interval with the next level time interval. If the connection request has been rejected at decision block 424, the routine proceeds to block 426 where the client may receive more content and other information from the server.

Figure 5:
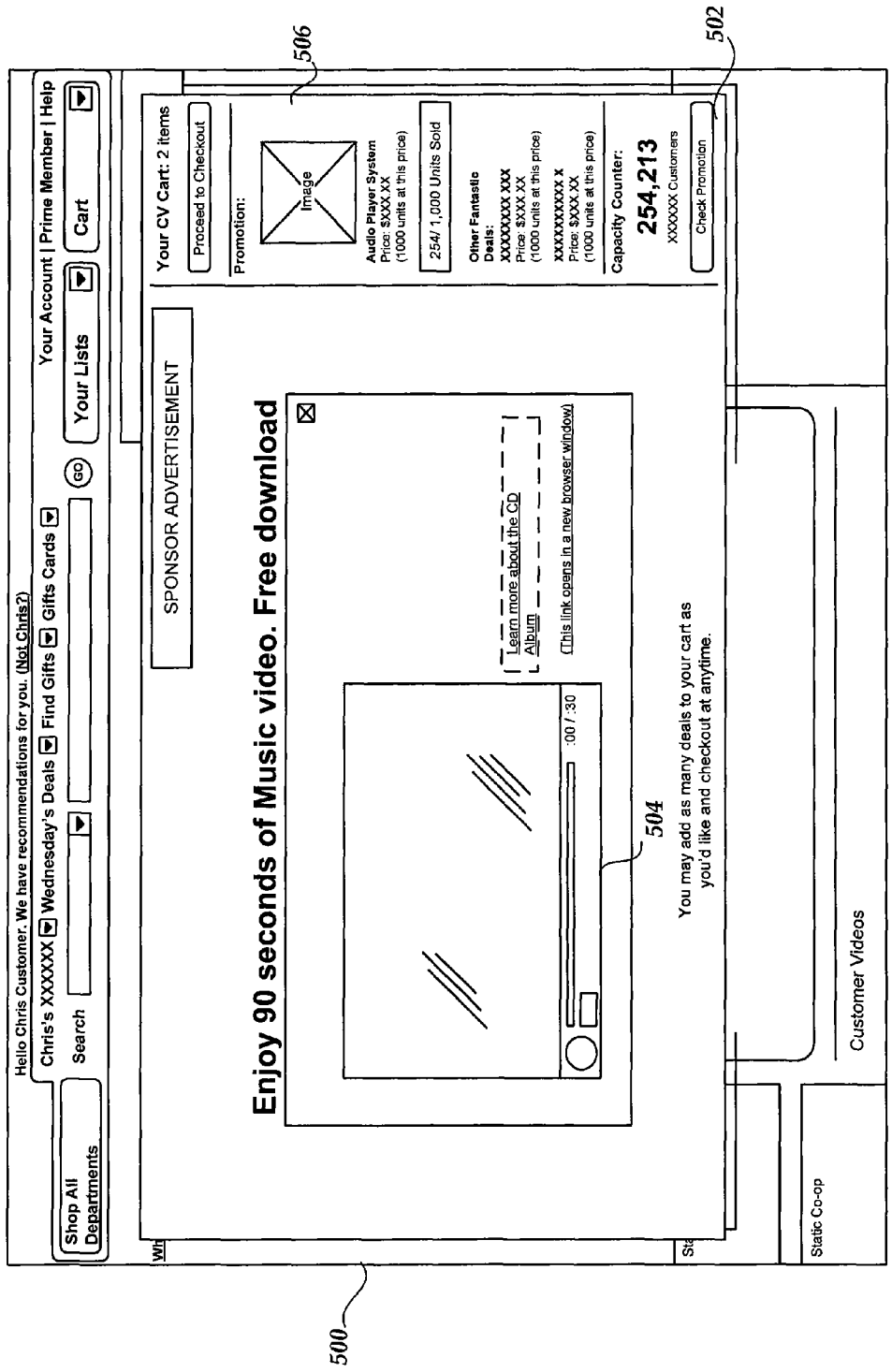
FIG. 5 is an example of a user interface generated when a user is provided media content by the client, in accordance with one embodiment.

If it is determined at decision block 405 that the event indicating the peak traffic situation has occurred, the client retrieves content that will be used to entertain or interact with the user and obtains the time interval provided from the server at block 406. At block 408, during the time interval, the client presents a portion of content in response to the user's interactions. In some embodiments, the client is configured to entertain the user with the content. As will be discussed in greater detail below, there are various types of contents that can be used to entertain the user. For example, video and audio content can be used to entertain the user. The video and audio content may be related to the item that is offered in the promotion or information of interest. For example, FIG. 5 depicts an example of a user interface display that can be generated when the client presents content to the user for the current time interval. As shown, a free music video 504 associated with a music CD is presented to the user for the current time interval, for example 90 seconds. In addition, the user is provided with the ability to purchase the music CD or learn more about the music CD via the client. In one embodiment, the video and audio content may be streamed from local memory of the client or from a third party service provider such as, among other possibilities, an edge cache. In one embodiment, the client may enable the user to converse with other users through instance messaging or chatting. The client may also obtain more content from various servers that are not part of the server to entertain or interact with the user. As shown, other information, including information about a promotion item such as "Audio Player System" 506, or a selection button 502 to activate a Web page including detail information about a promotion campaign may be presented to the user.

In one embodiment, by using the content provided by the server, the client may interact with the user as if the server interacts, thereby providing a seamless customer experience between connections.

At block 410, if necessary, the client may store (queue) the user's interactions in local memory during the time interval. At block 412, the client sends the server a request for connection after the time interval. At block 414, upon establishing the connection, the client sends the server the stored user interactions, so that the server can start communication with the user where the user believes to be the next phase. For example, a user may have wished to purchase an item during the time interval. After the connection, the client sends the user's indication to purchase the item to the server. The server will locate the item from the catalog database and make the item available for purchase, for example, by placing the item in a shopping cart and allowing the user to check out. At block 416, the client may receive more content from the server. In some cases, additional content may be provided in response to a user's interaction, or additional flash content may be provided so that the client can entertain or interact with the user without establishing a connection with the server during the time interval. At block 418, the client may store a new time interval if the server provides the new time interval for the next connection. As mentioned above, the new time interval will be used for the next connection to the server. The client will continue to perform the above mentioned steps as long as the user indicates to communicate with the server.

As discussed above, in some embodiments, the server may use a contest or game to throttle a number of current users. For example, the server may provide the client with content that includes several rounds of a contest (game) which is designed to gradually reduce the number of current users. That is, after an initial connection with the server, a user is allowed to participate in the contest while the number of users participating in the contest has not reached a threshold number or maximum number. The traffic management routines implemented in the server and the client in such embodiments are depicted in connection with FIGS. 6 and 7, discussed below.

Figure 6:
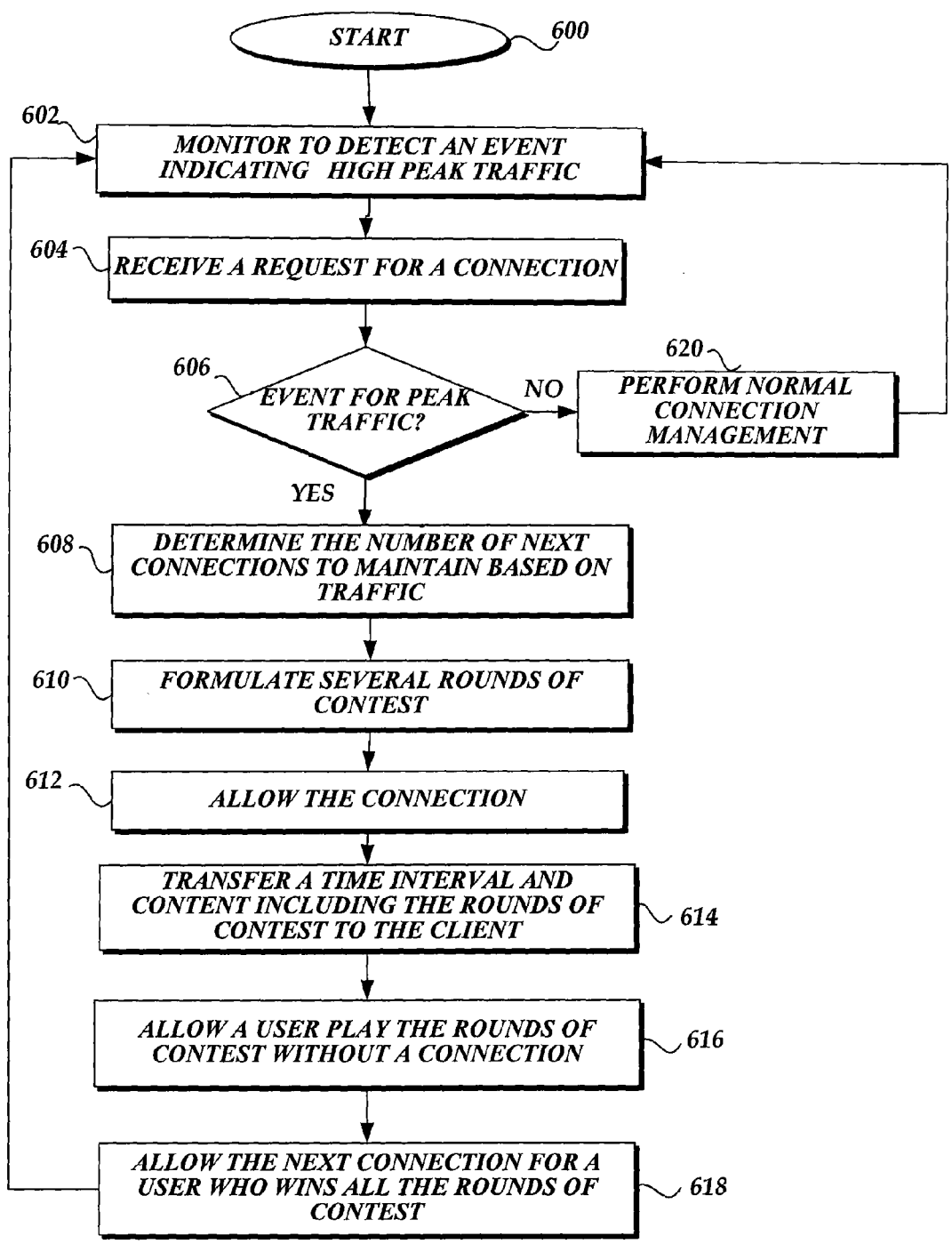
FIG. 6 is a flow diagram of a routine for a server to manage peak traffic through throttling a number of users in accordance with one embodiment.

Referring to FIG. 6, a flow diagram 600 depicts a traffic management routine for a server to manage peak traffic through throttling a number of users in accordance with one embodiment. Beginning with block 602, the server may monitor to detect an event indicating a peak of traffic. In one embodiment, the server may monitor a total number of first connection requests, currently connected users, other statistic information, etc. to determine if the traffic reaches a threshold level. As with FIG. 3, the threshold level may be previously determined, taking a capacity of the server, bandwidth, etc. into consideration. At block 604, the server receives a request for a connection at block 606. At decision block 606, a determination is made as to whether an event indicating peak traffic is detected. If it is determined at block 606 that such an event is not detected, the server performs a normal connection management at block 620. The routine returns back to block 602.

If it is determined at block 606 that such an event is detected, at block 608, the server may determine the number of next connections (users) to maintain based on the traffic. In one embodiment, the number of users to throttle may be determined to ease the peak traffic. At block 610, the server may formulate several rounds of contest in content based on the determined number of connections to maintain or throttle. The server allows the connection between the server and the client at block 612. Subsequently, the server transmits the time interval information to the client so that the client can be aware of the peak traffic situation at block 614. Upon receiving the time interval information, the client holds from sending the server a next connection request until the time interval lapses. The server also transmits the content including a several rounds of contest which can be used to throttle a certain number of users who can have a next connection with the server at block 614. At block 616, the user is allowed to participate in the rounds of the formulated contest via the client. At block 618, according to this embodiment, the server allows the next connection for the users who win all of the rounds of contest, while not allowing some of the users to continue to participate. The routine may repeat the above-mentioned steps until a desired number of users remain.

Figure 7:
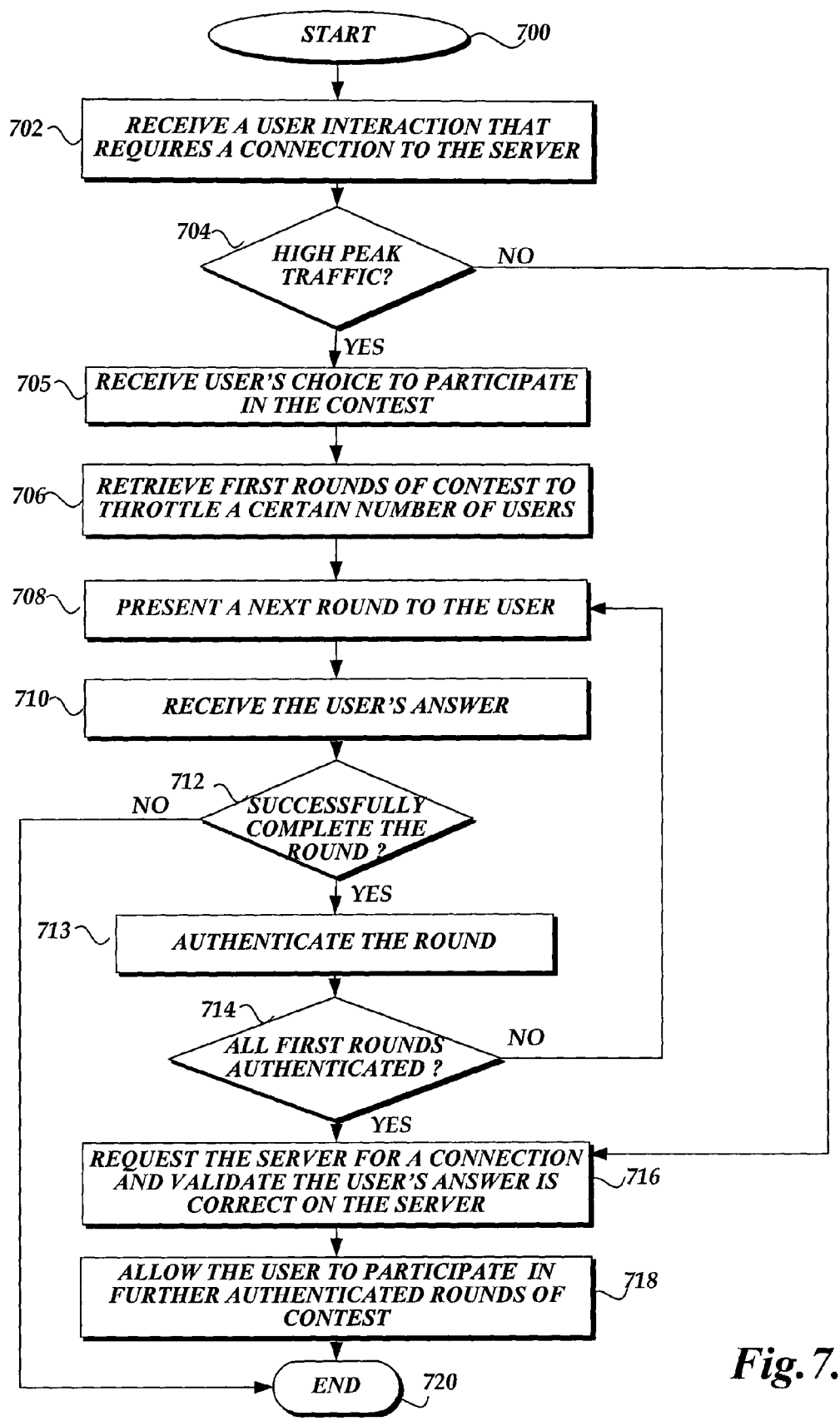
FIG. 7 is a flow diagram of a traffic management routine for a client to throttle a certain number of clients so that a manageable number of connections can be allowed at a given time in accordance with one embodiment.

Referring to FIG. 7, a flow diagram 700 depicts a traffic management routine for a client to throttle a certain number of users so that a manageable number of connections can be allowed in accordance with one embodiment. For the sake of the discussion, it is assumed that a client has established an initial connection with the server. Beginning with block 702, the client received a user interaction that requires a new connection to the server. At decision block 704, a determination is made as to whether a triggering event for the peak traffic condition is detected in the server.

If no triggering event is detected, the client sends a connection request to the server at block 705. If a triggering event is detected, the client retrieves content that was previously provided by the server for peak traffic management at block 706. In particular, the content is provided by the server in order to throttle a certain number of users who want to connect to the server. For example, if the server offers a holiday promotion and the server detects an unusual peak of traffic, the server alerts clients about the situation and provides content for providing and rendering a contest. In this example, the user may be informed that the user will be able to get the promotion if the user wins a certain contest. The user may be also informed about the number of participants for the contest and how many prizes (promotion items) are offered for the contest. Typically, the contest may consist of several rounds. The client may provide a first set of rounds that can be presented offline, for throttling the number of participants.

After the user passes the first set of rounds, the user is allowed to be connected with the server and finish the second set of rounds. Since the first set of rounds is provided offline, there is a chance that more than the predicted number of users can pass the first set of rounds. At block 708, the client presents the content in response to the user's interactions. In some embodiments, information about the contest may be presented to the user. The user can choose to participate in the contest in order to get a prize, i.e., a promotion, etc. At block 710, the client receives the user's answer or interaction regarding the given round. At decision block 712, a determination is made as to whether the user successfully completes the round. Each round may require several answers or series of successful interactions. If it is determined that the user successfully completes the round, the client authenticates the round as being successful at block 713. At decision block 714, a determination is made as to whether all the first rounds have been authenticated. If there are more rounds that need to be authenticated (i.e. more rounds that the user needs to successfully complete), the routine returns to block 708 and repeats the above-mentioned steps. If it is determined that all the first rounds are authenticated at decision block 714, the client requests the server for a connection at 716. In some embodiments, some of the user's answers received during the first rounds may be needed to be validated on the server. In such embodiments, the client also validates if the user's answers and/or interactions are correct on the server. At block 718, the user is allowed to participate in second rounds of contest to win a promotion.

Figure 8A:
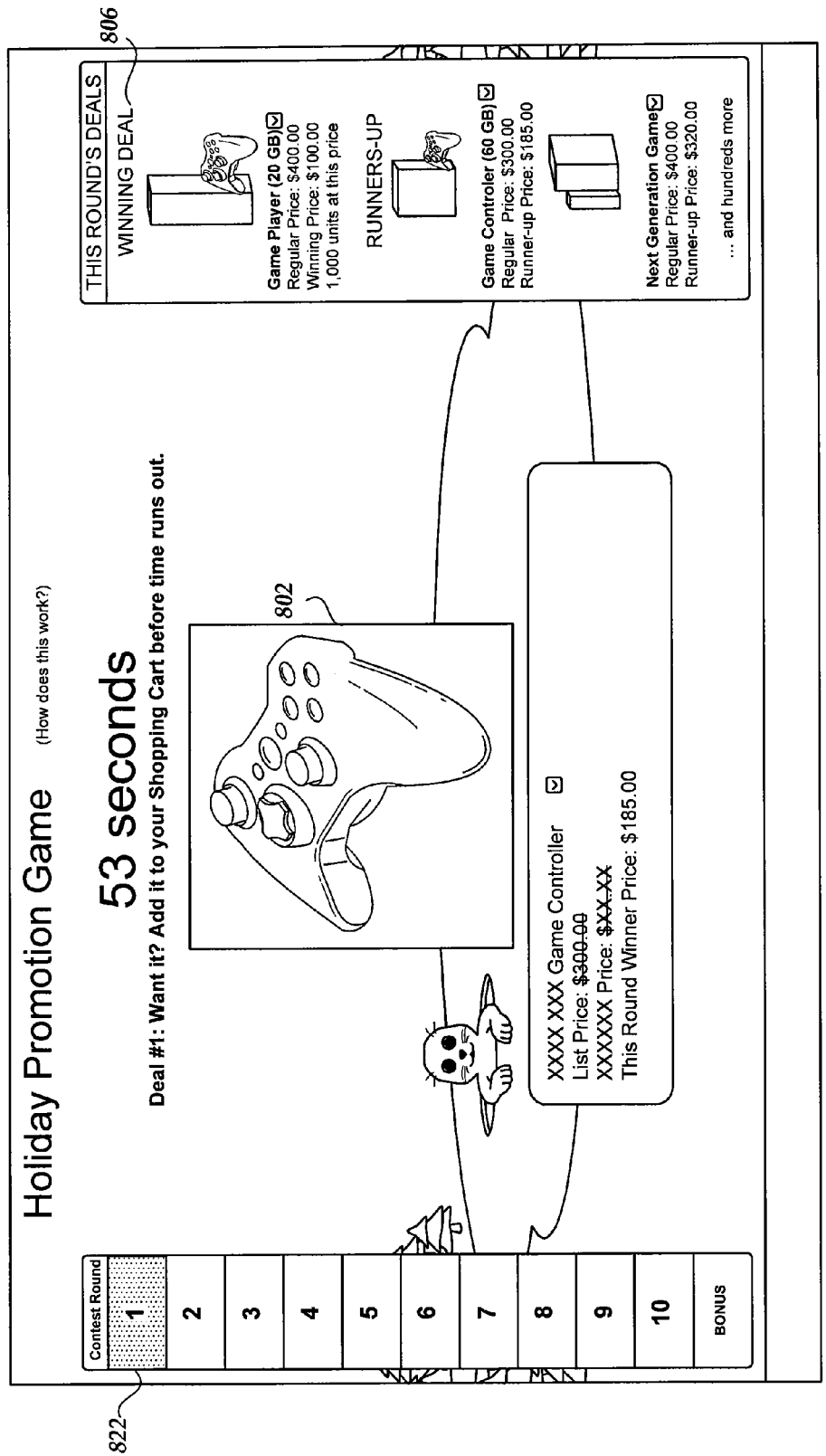
FIGS. 8A and 8B are example user interfaces generated while a user interacts with the Web server via a client to participate in a promotion in accordance with one embodiment.
Figure 8B:
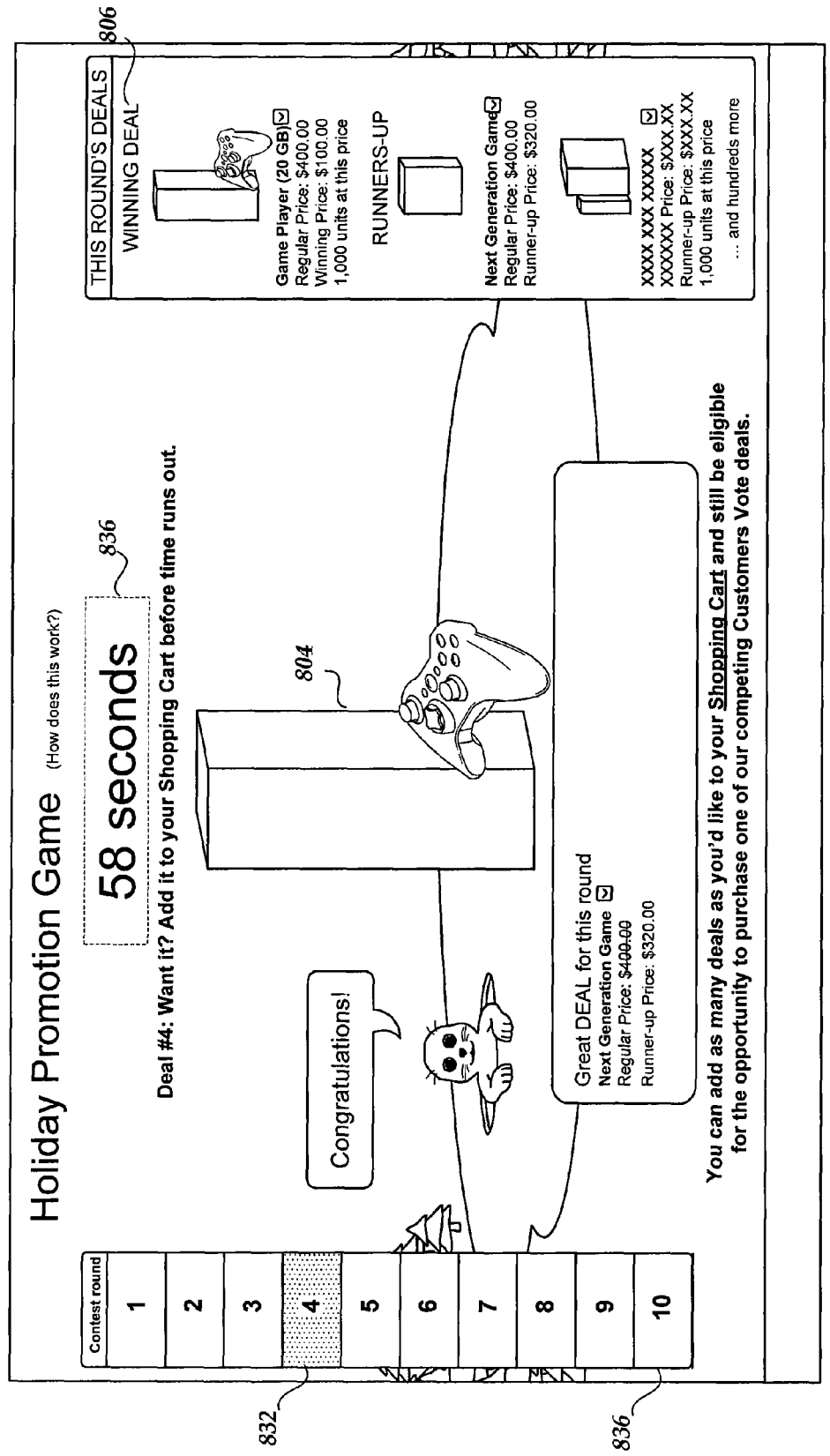

In some embodiments, the server may have several rules and conditions to make the user eligible for the next connection. As discussed above, the server may have a rule that if the user passes all the first rounds of the contest, the user is eligible for participating in the second rounds of the contest that requires a connection with the server. In some cases, the server may have other rules to throttle the participants. For example, if a user wins a certain number of the first rounds of the contest, the user may be allowed to take other offers or promotions, but the user will be removed from the contest. In this manner, the user can get something from winning the first rounds of the contest or a portion of the first rounds, but in return, the user gives up opportunities for participating in the later rounds. Referring to FIGS. 8A and 8B, example user interface displays generated while the user participates in a first round 822 and a fourth round 832 of a contest are shown. For each round, a "Runners-up" deal, for example, "Game Controller" 802, "Next Generation Game" 804, may be offered for a user respectively. In one embodiment, a user can be offered some promotion randomly regardless of the result of the first rounds of the contest or as a result of the first rounds of the contest. As shown in FIGS. 8A and 8B, the user may need to successfully complete all ten rounds in order to participate in other rounds of contest to win a "Wining Deal", for example, "Game player" 806.

Figure 9:
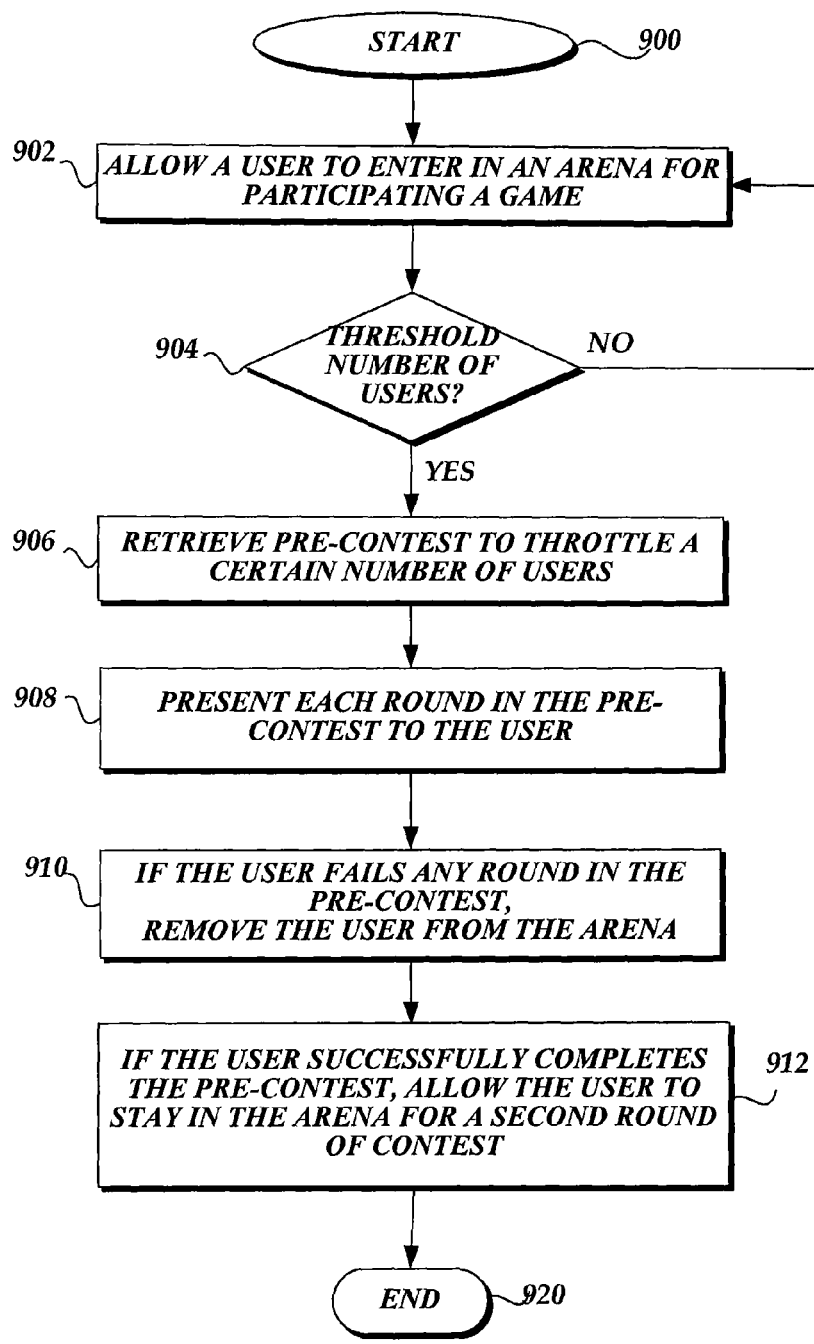
FIG. 9 is a flow diagram of a routine for providing a contest for allowing a limited number of users to remain in a game space in accordance with one embodiment.

Referring now to FIG. 9, a flow diagram 900 depicts a routine for providing a game to allow a limited number of users to remain in a game space in accordance with one embodiment. Beginning with block 902, a server may allow a user to enter in a game space (hereinafter, Arena) for a game or a contest. As discussed above, such a game or contest can be presented as part of a promotion campaign provided by the server. Referring now to the user interface of FIG. 10A, information about the current capacity of the Arena (how many users are currently in the Arena) such as "Capacity Counter" 1004, a promotion item, such as "Winning Deal" 1002, a threshold capacity for the Arena may be displayed. At decision block 904 (FIG. 9), a determination is made as to whether a threshold number of users have been entered in the Arena. If the threshold number of users have not been entered in the Arena, the server may return back to block 902 where the server allows more users to enter in the Arena for participating in the contest (game). If the threshold number of users has been entered in the Arena, a pre-contest may be retrieved at block 906. In one embodiment, the pre-contest is presented via a client so that the user can play the pre-contest without connecting to the server. The pre-contest is provided to throttle a number of users in the Arena without burdening the server. That is, the pre-contest may include one or more rounds of a game, puzzle, or the like, each of which is designed to remove a certain number of users from the Arena. If a user fails any round in the pre-contest, the user will be removed from the Arena. After the user successfully completes each round in the pre-contest, the user is allowed to stay in the Arena for the contest. In one embodiment, the user may be informed that the user will be able to participate in the contest only if the user wins the pre-contest. The user may be also informed about the number of participants for the contest and how many prizes are offered for the contest.

Figure 10B:
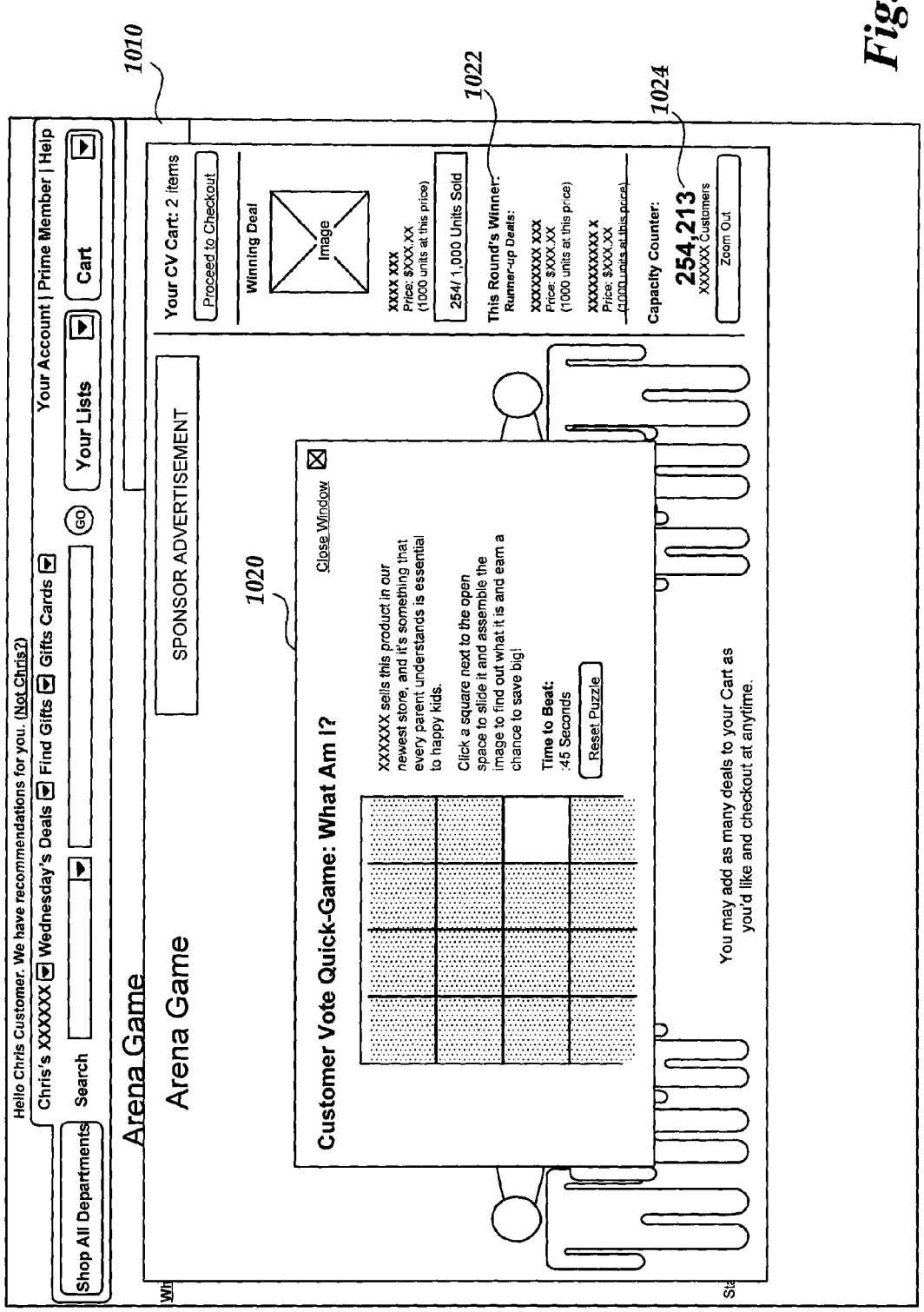
Figure 10C:
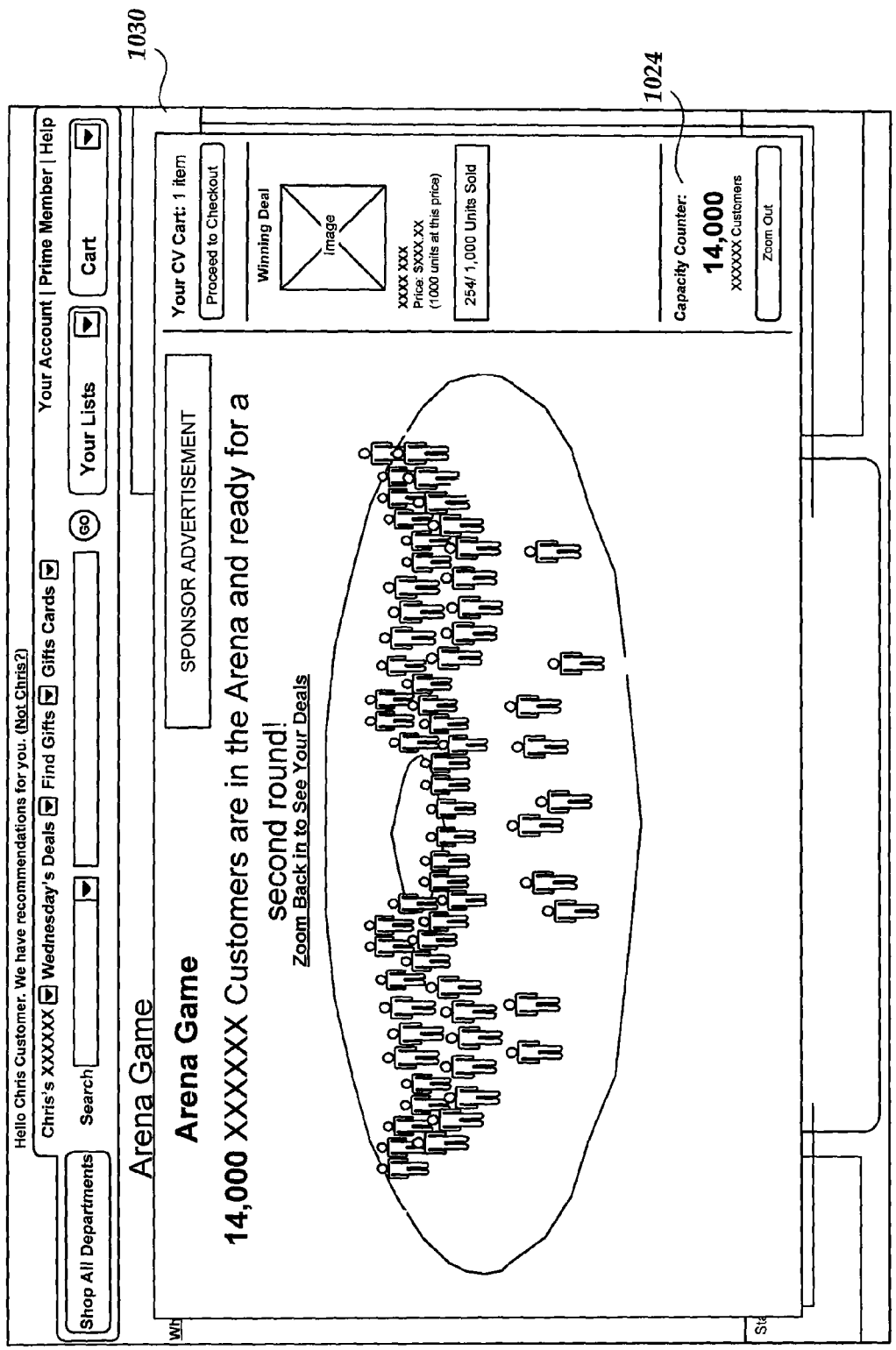

At block 908, each round of the pre-contest may be presented to the user. As shown in the user interface display of FIG. 10B, a pre-contest for a promotion campaign including several rounds is presented to the user. As shown, a sub-window can be presented to the user, such as a sub window 1020, for presenting one round of the pre-contest. In one embodiment, each round of the pre-contest may have a prize or award for a user who wins that round. For example, if a user wins one or more rounds of the pre-contest, the user may be allowed to take other offers or promotions but the user will be removed from the Arena. In this manner, the user can get something from winning the pre-contest or a portion of the pre-contest, but in return, the user voluntarily gives up a space in the Arena which is already crowded. Referring to FIG. 10B, if a user successfully assembles the image by moving tiles displayed in the sub window 1020, a user may be entitled to a "Runner-up Deal" 1022 which allows the user to purchase items for a discounted price. The user can take the "Runner-up Deal" 1022 and stop participating in the pre-contest. In such a case, the user is removed from the Arena. The user can participate in each round in the pre-contest that are designed to eliminate certain numbers of users from the Arena. If the user fails any round of the pre-contest, the user is removed from the Arena as depicted at block 910. If the user successfully completes all the rounds of the pre-contest, the user is allowed to stay in the Arena for further participating in the contest in the Arena, as depicted at block 912. The user can then complete with other users in the Arena. As with FIGS. 6 and 7, in some cases, several more rounds of pre-contest may be dynamically determined if the number of users are not reduced enough from the Arena. As shown in FIG. 10C, the user may be informed about the current number of users who will participate in the second round of the contest, for example "Capacity Counter" 1024.

As discussed above, the various embodiments can be implemented in a wide variety of operating environments, which in some cases can include one or more user computers, computing devices, or processing devices which can be used to operate any number of applications. User or user devices can include any number of general purpose personal computers, such as desktop or laptop computers running a standard operating system, as well as cellular, wireless, and handheld devices running mobile software and capable of supporting a number of networking and messaging protocols. Such a system also can include a number of workstations running any variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®. In one embodiment, a system utilizes Berkeley DB, which is a family of open source, embeddable databases that allow developers to incorporate within their applications a fast, scalable, transactional database engine with industrial grade reliability and availability.

The environment can include a variety of data stores and other memory and storage media as discussed above. These can reside in a variety of locations, such as on a storage medium local to (and/or resident in) one or more of the computers that are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the description as set forth in the claims.

What is claimed is:

1. A computer program product embedded in a non-transitory computer readable storage medium for managing a number of concurrent connections, comprising program code configured for:

monitoring a number of connection requests to at least one host address for user-requested content;

establishing a first connection to a user device upon receiving a first connection request from a client application executed on the user device, the first connection request including a first request for the user-requested content; and at a time after the number of connection requests exceeds a threshold level, setting a time interval between the first connection and a second connection from the user device to the at least one host address for the user-requested content;

transferring interactive content and information about the time interval to the client application, the interactive content, the interactive content being operable to be presented by the client application when the user device is not connected to the at least one host address, the information including a duration of the time interval; and causing the interactive content to be presented on the user device during the time interval when the user device is not connected to the at least one host address such that presentation of the interactive content changes based at least in part on user interaction with the interactive content;

causing information for the user interaction to be stored in a local memory of the user device at least for the duration of the time interval, the information for the user interaction including a request for additional interactive content; and after the time interval is complete, receiving a second connection request from the client application, the second connection request including a second request for the user-requested content; and receiving from the local memory of the user device the information for the user interaction at the at least one host address;

if the number of connection requests to the at least one host address for the user-requested content exceeds the threshold level at a time of the second connection request:

adjusting the time interval between the first connection and the second connection to the at least one host address for the user-requested content; and providing the additional interactive content and information about the adjusted time interval to the client device in response to the request included in the received information for the user interaction, the additional interactive content being operable to be presented by the client application when the user device is not connected to the at least one host address, the information about the adjusted time interval including a duration of the adjusted time interval;

and if the number of connection requests to the at least one host address for the user-requested content is less than the threshold level at the time of the second connection request, then at least:

establishing the second connection from the user device to the at least one host address; and providing, by the second connection, the user-requested content to the user device.

2. The computer program product of claim 1, further comprising program code for:

adjusting the time interval based at least in part on changes in traffic conditions and capacity conditions in a server.

3. The computer program product of claim 2, further comprising program code for:

pushing the adjusted time interval to the user device.

4. The computer program product of claim 3, wherein additional interactive content is obtained and pushed to the user device.

5. A computer-implemented method of managing a number of concurrent connections, comprising:

monitoring a number of connection requests to at least one host address for user-requested content;

establishing a first connection to a user device upon receiving a first connection request from a client application executed on the user device, the first connection request including a first request for the user-requested content; and at a time after the number of connection requests exceeds a threshold level:

setting a time interval between the first connection and a second connection from the user device to the at least one host address for the user-requested content;

transferring interactive content and information about the time interval to the client application, the interactive content being operable to be presented by the client application when the user device is not connected to the at least one host address, the information including a duration of the time interval;

causing the interactive content to be presented on the user device during the time interval when the user device is not connected to the at least one host address such that presentation of the interactive content changes based at least in part on user interaction with the interactive content; and causing information for the user interaction to be stored in a local memory of the user device for at least the duration of the time interval, the information for the user interaction including a request for additional interactive content; and after the time interval is complete, receiving a second connection request from the client application, the second connection request including a second request for the user-requested content; and receiving the information for the user interaction from the local memory of the user device at the at least one host address;

if the number of connection requests to the at least one host address for the user-requested content exceeds the threshold level at a time of the second connection request:

adjusting the time interval between the first connection and the second connection to the at least one host address for the user-requested content; and providing the additional interactive content and information about the adjusted time interval to the client device in response to the request included in the received information for the user interaction, the additional interactive content being operable to be presented by the client application when the user device is not connected to the at least one host address, the information about the adjusted time interval including a duration of the adjusted time interval;

and if the number of connection requests to the at least one host address for the user-requested content is less than the threshold level at the time of the second connection request, then at least:

establishing the second connection from the user device to the at least one host address; and providing, by the second connection, the user-requested content to the user device.

6. The computer-implemented method of claim 5, wherein the time interval is determined based at least in part on capacity to handle a number of concurrent connections at a given time.

7. The computer-implemented method of claim 5, wherein the interactive content includes one of media content, catalog information, promotion information, or game content.

8. The computer-implemented method of claim 5, further comprising:
adjusting the time interval based at least in part on changes in the number of connection requests; and
transferring the adjusted time interval to the client application.

9. The computer-implemented method of claim 5, further comprising:
receiving, from the client application, information for the user interaction regarding the interactive content.

10. The computer-implemented method of claim 5, further comprising:
processing the received information for the user interaction before sending information to the client application at the time of the second connection.

11. A system for of managing a number of concurrent connections, the system comprising:
a processor; and
a memory device including instructions that, when executed by the processor, cause the processor to:
monitor a number of connection requests to at least one host address for user-requested content;
establish a first connection to a user device upon receiving a first connection request from a client application executed on the user device, the first connection request including a first request for the user-requested content; and
at a time after the number of connection requests exceeds a threshold level:
set a time interval between the first connection and a second connection from the user device to the at least one host address for the user-requested content;
transfer interactive content and information about the time interval to the client application, the interactive content being operable to be presented by the client application when the user device is not connected to the at least one host address, the information including a duration of the time interval; and
cause the interactive content to be presented on the user device during the time interval when the user device is not connected to the at least one host address such that presentation of the interactive content changes based at least in part on user interaction with the interactive content;
cause information for the user interaction to be stored in a local memory of the user device for at least the duration of the time interval, the information for user interaction including a request for additional content; and
after the time interval is complete,
receive a second connection request received from the client application, the second connection request including a second request for the user-requested content; and
receive the information for the user interaction from the local memory of the user device at the at least one host address;
if the number of connection requests to the at least one host address for the user-requested content exceeds the threshold level at a time of the second request:
adjust the time interval between the first connection and the second connection to the at least one host address for the user-requested content; and
provide the additional interactive content and information about the adjusted time interval to the client device in response to the request included in the received information for the user interaction, the additional interactive content being operable to be presented by the client application when the user device is not connected to the at least one host address, the information about the adjusted time interval including a duration of the adjusted time interval;
and if the number of connection requests to the at least one host address for the user-requested content is less than the threshold level at the time of the second connection request, then at least:
establish the second connection from the user device to the at least one host address; and
provide, by the second connection, the user-requested content to the user device.

12. The system of claim 11, wherein the time interval is determined based at least in part on capacity to handle a number of concurrent connections at a given time.

13. The system of claim 11, wherein the interactive content includes one of media content, catalog information, promotion information, or game content.

14. The system of claim 11, wherein the memory device further includes instructions that, when executed by the processor, cause the processor to:
adjust the time interval based at least in part on changes in the number of connection requests; and
transfer the adjusted time interval to the client application.

15. The system of claim 11, wherein the memory device further includes instructions that, when executed by the processor, cause the processor to receive, from the client application, information for the user interaction regarding the interactive content.

16. The system of claim 11, wherein the memory device further includes instructions that, when executed by the processor, cause the processor to process the received information for the user interaction before sending information to the client application at the time of the second connection.

* * * * *